United States Patent [19]
Gould et al.

[11] Patent Number: 6,134,445
[45] Date of Patent: Oct. 17, 2000

[54] WIRELESS TERMINAL ADAPTED FOR MEASURING SIGNAL PROPAGATION CHARACTERISTICS

[75] Inventors: Kevin William Gould, Tinton Falls; Majid Ressalei, Eatontown; Frederick Willard Snider, Long Branch, all of N.J.

[73] Assignee: Lucent Technologies, Inc., Murray Hill, N.J.

[21] Appl. No.: 08/900,244

[22] Filed: Jul. 24, 1997

[51] Int. Cl.⁷ .................................. H04Q 7/32; H04Q 7/34
[52] U.S. Cl. ........................ 455/456; 455/566; 455/575; 455/90; 455/226.4; 455/158.4; 455/158.5; 455/67.1; 379/433; 379/428
[58] Field of Search ..................................... 455/456, 403, 455/423, 67.1, 425, 464, 38.3, 67.2, 115, 134, 226.1, 226.2, 226.4, 566, 575, 90, 158.4, 158.5, 158.1, 157.2; 379/433, 428

[56] References Cited

U.S. PATENT DOCUMENTS

| | | | |
|---|---|---|---|
| 4,048,564 | 9/1977 | Gleeson, Jr. ......................... | 455/226.1 |
| 4,896,370 | 1/1990 | Kasparian et al. ...................... | 455/423 |
| 5,398,276 | 3/1995 | Lemke et al. ......................... | 455/226.1 |
| 5,451,839 | 9/1995 | Rappaport et al. ..................... | 455/423 |
| 5,490,288 | 2/1996 | Wiatrowski ............................. | 455/423 |
| 5,539,803 | 7/1996 | Bhat et al. ............................... | 455/423 |
| 5,613,232 | 3/1997 | Toshida et al. ....................... | 455/226.4 |
| 5,873,026 | 2/1999 | Reames .................................. | 455/464 |

*Primary Examiner*—Fan Tsang
*Assistant Examiner*—Keith Ferguson
*Attorney, Agent, or Firm*—DeMont & Breyer, LLC; Jason Paul DeMont; Wayne S. Breyer

[57] ABSTRACT

A wireless terminal is disclosed that functions as both a telecommunications device and as a wireless test tool. Illustratively, the terminal comprises a first electro-acoustic transducer for converting a first acoustic signal into an outgoing signal; a wireless transmitter capable of transmitting the outgoing signal to a remote base station; a wireless receiver capable of receiving a plurality of incoming signals from the base station; a second electro-acoustic transducer for converting one of the plurality of incoming signals into a second acoustic signal; a visual display; and a terminal processor for determining a power level for each of the plurality of incoming signals and for contemporaneously displaying an indicium of the power level for each of the plurality of incoming signals onto the visual display.

20 Claims, 6 Drawing Sheets

WIRELESS TERMINAL ADAPTED FOR MEASURING SIGNAL PROPAGATION CHARACTERISTICS

FIELD OF THE INVENTION

The present invention relates to wireless telecommunications in general, and, more particularly, to a wireless terminal for measuring signal propagation characteristics.

BACKGROUND OF THE INVENTION

FIG. 1 depicts the floorplan of one floor of a typical office building (doorways and other details not shown) that shows the location of wireless base stations 105-1, 105-2 and 105-3 that provide wireless telecommunications service to wireless terminal 110. The walls, furniture and other objects within the building dramatically affect the propagation of radio signals such that in some parts of the building the radio signals may be so attenuated that they cannot be adequately received. Although increasing the radiated power from a transmitter can overcome such attenuation, the maximum radiated power may be restricted by law, by health considerations or by electrical limitations of the transmitter. In practice, inadequate signal coverage is addressed by adding base stations or by moving one or more existing base stations.

The process of adding or moving base stations to overcome signal strength deficiencies is fundamentally an empirical process that is helped by good test tools. Typically, a craftsperson makes an educated guess on where to add or move base stations to alleviate the deficiency. Then the craftsperson uses a test tool to measure the radio signal strength and bit error rate from each base station from the desired locations in the building to determine if the deficiency has been overcome. Typically, the test tool is an expensive piece of equipment designed specifically for measuring the radio signal propagation characteristics. Unfortunately, as indoor wireless systems become cheaper and more prevalent, such test tools are prohibitively expensive to purchase.

SUMMARY OF THE INVENTION

Some embodiments of the present invention are capable of functioning as a wireless test tool without some of the costs and restrictions associated with wireless test tools in the prior art. In particular, a wireless terminal in accordance with the illustrative embodiment is capable of functioning as a wireless test tool and because the one device integrates the two functions, it typically costs less than wireless test tools in the prior art.

This advantage can be found in an illustrative embodiment of the present invention that comprises: a first electro-acoustic transducer for converting a first acoustic signal into an outgoing signal; a wireless transmitter capable of transmitting said outgoing signal to a remote base station; a wireless receiver capable of receiving a plurality of incoming signals from said base station; a second electro-acoustic transducer for converting one of said plurality of incoming signals into a second acoustic signal; a visual display; and a terminal processor for determining a power level for each of said plurality of incoming signals and for contemporaneously displaying an indicium of said power level for each of said plurality of incoming signals onto said visual display.

BRIEF DESCRIPTION OF THE DRAWINGS

FIG. 11 depicts an illustrative screen showing the bit error rate of temporally-disparate signals in a TDMA system.

FIG. 12 depicts an illustrative screen showing the bit error rate of temporally-disparate signals in a TDMA system.

FIG. 13 depicts an illustrative screen showing the source of frequency-disparate signals in a TDM system.

FIG. 14 depicts an illustrative screen showing the source of temporally-disparate signals in a TDMA system.

DETAILED DESCRIPTION

Figure 1:
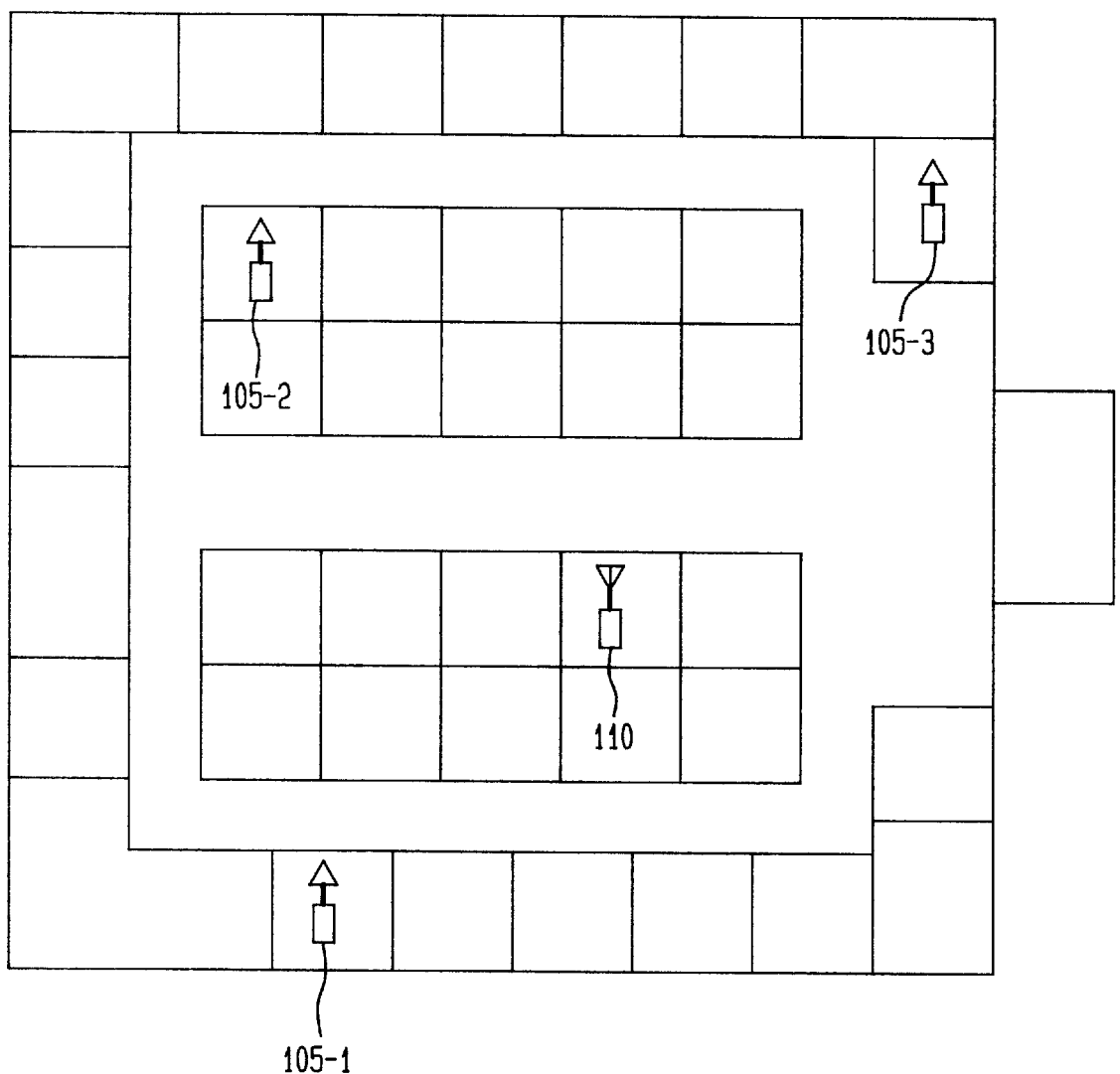
FIG. 1 depicts the floorplan of one floor of a typical office building in the prior art.
Figure 2:
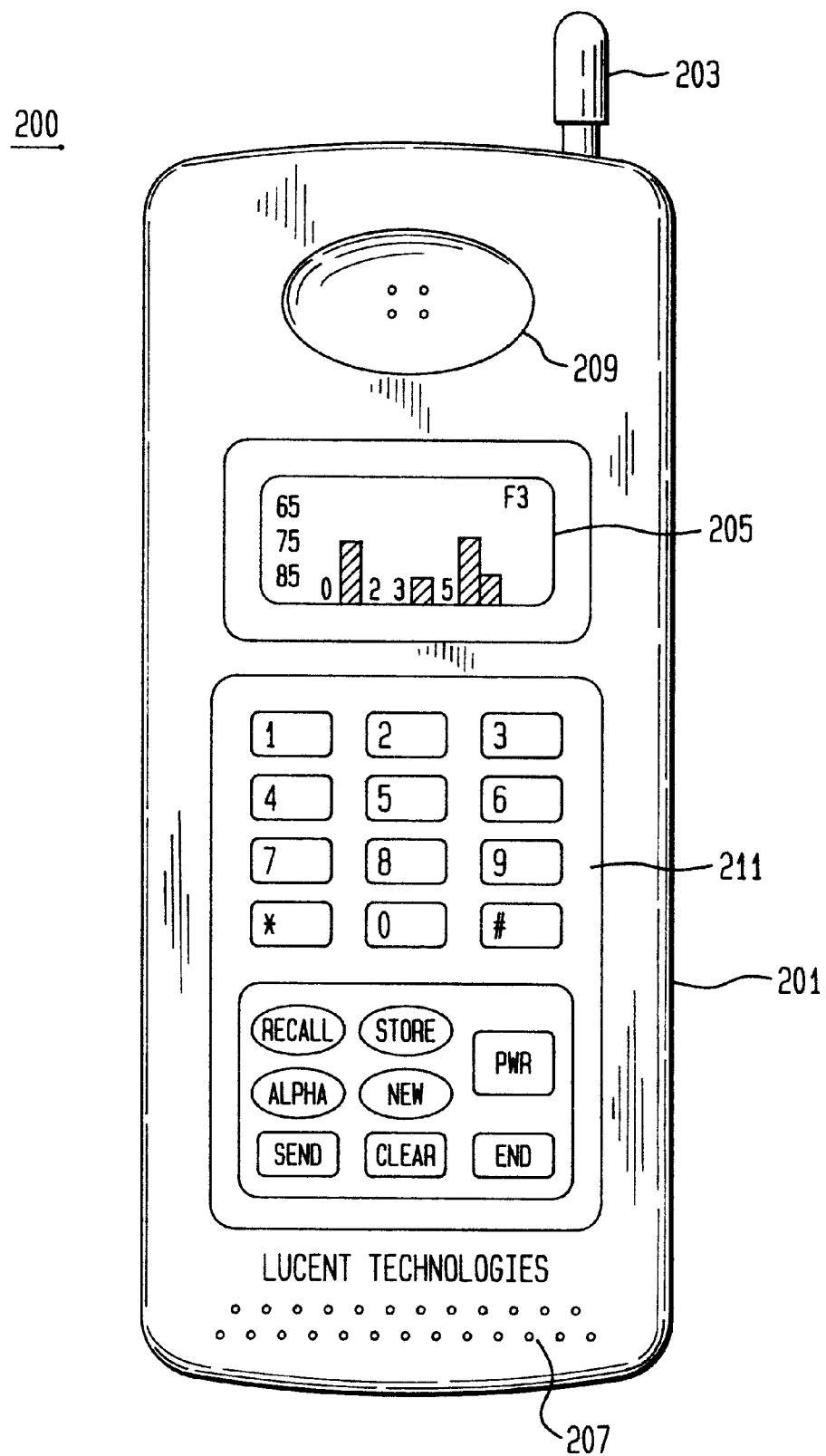
FIG. 2 depicts a wireless terminal and test tool in accordance with the illustrative embodiment of the present invention.

FIG. 2 depicts a drawing of a wireless terminal in accordance with the illustrative embodiment of the present invention that provides the functionality of a wireless terminal and that of a wireless test tool. The integration of the functionality of the wireless test tool into a standard wireless terminal is advantageous because it provides a user with an alternative to purchasing an expensive stand-alone wireless test tool. This is possible because a standard wireless terminal can be enhanced to provide wireless test capability for only a marginal increase in cost.

The wireless terminal in FIG. 2 advantageously comprises: housing 201, antenna 203, display 205, a first electro-acoustic transducer such as microphone 207, a second electro-acoustic transducer such as speaker 209 and keypad 211. It will be clear to those skilled in the art how to make and use each of the components depicted in FIG. 2.

Figure 3:
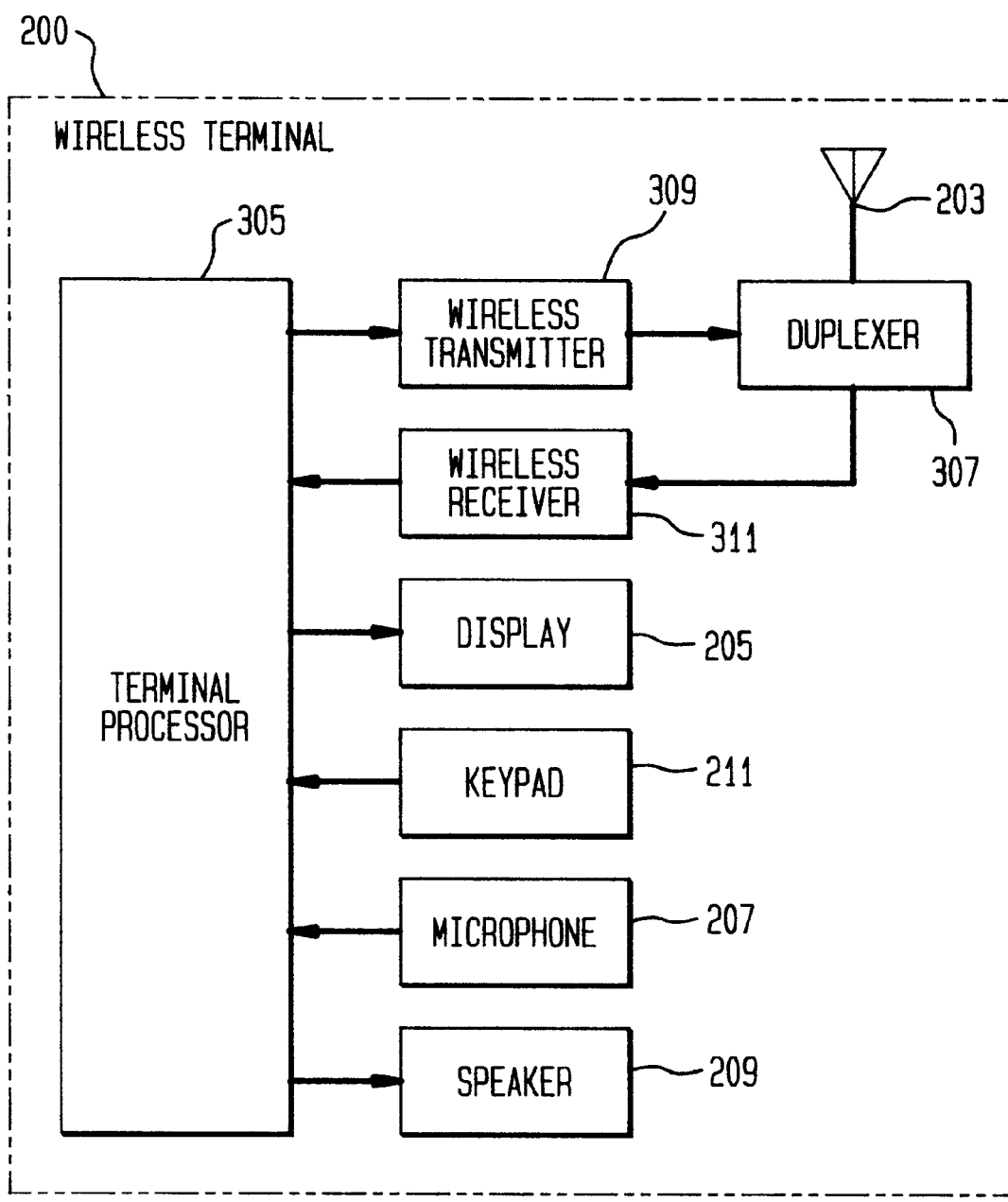
FIG. 3 depicts a block diagram of the components of the wireless terminal in FIG. 2.

FIG. 3 depicts a block diagram of the major components of wireless terminal 200 that are pertinent to an understanding of the illustrative embodiment. As shown in FIG. 3, wireless terminal 200 advantageously comprises: antenna 203, display 205, microphone 207, speaker, 209, keypad 211, duplexor 307, wireless transmitter 309, wireless receiver 311, and terminal processor 305, interconnected as shown. Duplexor 307 enables wireless transmitter 309 and wireless receiver 311 to use a single antenna.

Wireless receiver 311 is advantageously capable of receiving and decoding Frequency-Division Multiplexed ("FDM"), Frequency-Division Multiple Access ("FDMA"), Time-Division Multiplexed ("TDM"), Time-Division Multiple Access ("TDMA"), Time-Division Duplex ("TDD"), Code Division Multiplexed ("CDM") or Code Division Multiple Access ("CDMA") transmissions, or any combination of these as the designer chooses for frequencies and air-interface standards as the designer chooses. Although wireless terminals are traditionally built to receive FDM, TDM or CDM signals, or a combination of them, it will be clear to those skilled in the art how to build a wireless terminal that is capable of receiving any or all of FDMA, TDMA or CDMA signals, as are traditionally received and decoded by base stations.

Wireless receiver 311 is also advantageously capable of measuring the signal strength (in dBm) of each incoming signal, which can be done by scanning through all of the detected incoming signals one at a time. Wireless receiver 311 is also advantageously capable of measuring the bit-error rate of each incoming signal, which can also be done by scanning through all of the detected signals one at a time. Wireless receiver 311 is also advantageously capable of determining the source, whether it is a base station or other wireless terminal, of each incoming signal, provided, of course, that the incoming signal strength is sufficient and that wireless receiver 311 knows the protocol of the incoming signal. Typically, the source of a signal from a base station is identified by the Cell ID for the base station or for the antenna face of the base station. Typically, the source of a signal from a wireless terminal is identified by the electronic serial number ("ESN") or the mobile identification number ("MIN") of the terminal. Wireless receiver 311 is also advantageously capable of providing to terminal processor 305 the measured signal strength, bit error rate and source of each incoming signal. Because wireless terminal 200 is advantageously also capable of functioning as a telecommunications device as well as a test tool, wireless receiver 311 is also capable of providing an incoming signal, or a portion of an incoming signal, to terminal processor 305 for output through speaker 209. It will be clear to those skilled in the art how to make and use wireless receiver 311.

Wireless transmitter 309 is advantageously capable of encoding and transmitting Frequency-Division Multiple Access ("FDMA") Time-Division Multiple Access ("TDMA"), or Code Division Multiple Access ("CDMA") transmissions, or any combination of these as the designer chooses for frequencies and air-interface standards as the designer chooses. It is preferred, but not necessary, that wireless transmitter 309 be capable of transmitting in an access schemes that corresponds to one of the multiplex schemes that wireless receiver 311 is capable of receiving. For example, if wireless receiver 311 is capable of receiving and decoding FDM transmissions, wireless transmitter 309 is advantageously capable of FDMA transmission. Similarly, if wireless terminal 311 is capable of receiving and decoding CDM transmissions, wireless transmitter 309 is advantageously capable of CDMA transmission. Wireless terminal 309 is also advantageously capable of transmitting to a base station any or all of the signal strength and bit error rate measurements made by wireless receiver 311, as well as the signal source information corresponding to each incoming signal. It will be clear to those skilled in the art how to make and use wireless transmitter 309.

Terminal processor 305 is advantageously an appropriately programmed general-purpose computer that comprises RAM, ROM, non-volatile RAM and associated circuitry. Alternatively, terminal processor 305 can be a hard-wired special-purpose computer, or a combination of a general-purpose computer and a special-purpose computer. Terminal processor 305 is advantageously capable of receiving input from microphone 207 and keypad 211 in well-known fashion and for providing output to speaker 209, and display in well-known fashion. Because wireless terminal 200 is capable of functioning as an ordinary wireless terminal, terminal processor 305 is advantageously capable of receiving a incoming signal, or a portion of an incoming signal, from wireless receiver 311 and for outputting that signal through speaker 209. Terminal processor 305 is also advantageously capable of receiving an acoustic signal through microphone 207 and outputting it to wireless transmitter 309 for transmission to a base station. As the heart of wireless terminal 200, terminal processor 305 is advantageously capable of providing all of the functionality needed to provide standard telecommunications capability for wireless terminal 311.

Because wireless terminal 200 also advantageously provides the functionality of a wireless test tool, terminal processor 305 is capable of receiving information about the incoming signals from wireless receiver 311 and outputting that information on display 205, or transmitting it to a remote base station via wireless transmitter 309, or both.

Figure 4:
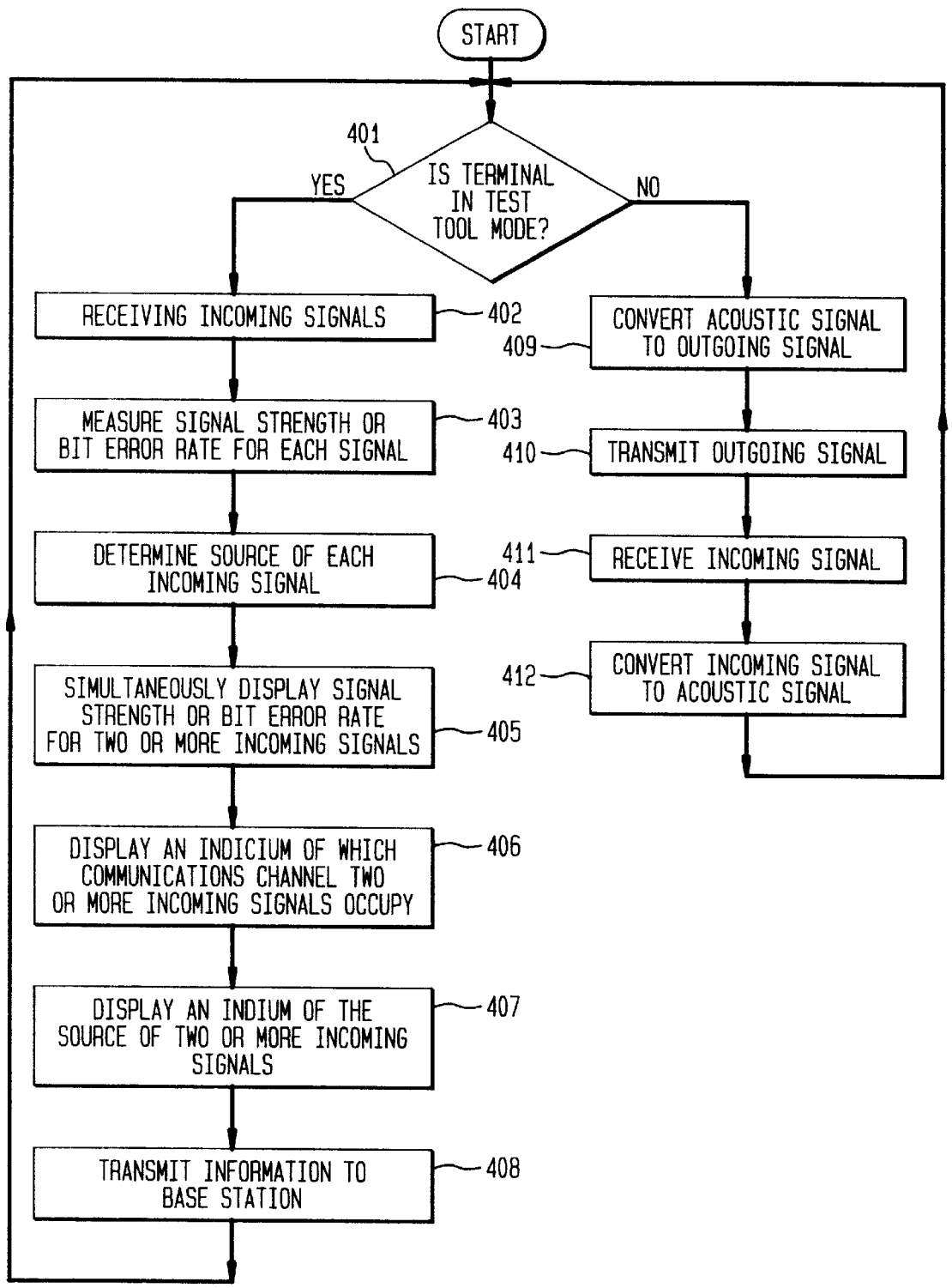
FIG. 4 depicts a flowchart of the operation performed by the wireless terminal in FIG. 2 in accordance with the illustrative embodiment of the present invention.

FIG. 4 depicts a flowchart of the operation of wireless terminal 200 in accordance with the illustrative embodiment. At step 401, wireless terminal 200 periodically or sporadically determines whether it is in test tool mode (in contrast to telecommunications mode). The user of wireless terminal 200 sets the mode through keypad 211. If wireless terminal is in test tool mode, control passes to step 402, during which wireless receiver 311 attempts to acquire as many signals as possible in the range of interest.

Typically, wireless terminal 200 in test mode will be programmed by the user to scan a set of channels (e.g., FDMA, TDMA, or CDMA) within a frequency range. For example, when wireless terminal 200 is configured to monitor a TDM system that comprises 64 channels configured as 8 frequency bands with 8 time slots in each band, then at step 402 wireless receiver scans the 8 frequency bands to locate and acquire up to 8 signals in those bands. Alternatively, when wireless terminal 200 is configured to monitor a TDMA system that comprises 64 channels configured as 8 frequency bands with 8 time slots in each band, then at step 402 wireless receiver scans all 8 frequency bands and 8 time slots in each band to acquire up to 64 separate transmitted signals.

At step 403, wireless receiver 311 advantageously measures the signal strength and bit error rate for each located signal, as it is scanned and acquired, in well-known fashion. At step 403, wireless receiver 311 determines the source of each incoming signal and passes to terminal processor 305 information relating: (1) which scanned channels are occupied by signals, (2) the signal strength of each acquired signal, (3) the bit error rate of each acquired signal, and (4) the source of each acquired signal.

Figure 5:
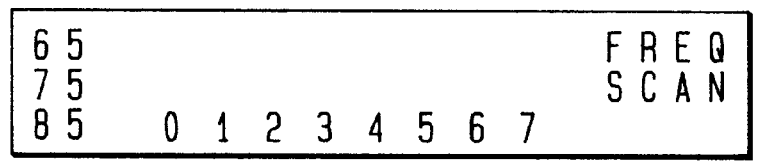
FIG. 5 depicts an illustrative screen showing the signal strength of frequency-disparate signals in a TDM system.

At step 405 terminal processor 305 outputs to display 205 one of a number of screens that provide information about the acquired signals to a user. The user controls which screens are displayed through entries in keypad 211, in well-known fashion. FIGS. 5 through 14 depict illustrative screens in accordance with the illustrative embodiment of the present invention. For example, FIG. 5 depicts display 205 as a bar graph of the signal strength of 8 frequency-disparate channels (labeled 0–7) in a TDM configuration. The numbers "65", "75" and "85" label the Y-axis in dBm. According to the bar graph in FIG. 5, no signals have been found in any of the 8 frequency bands that have a signal strength above 85 dBm.

Figure 6:
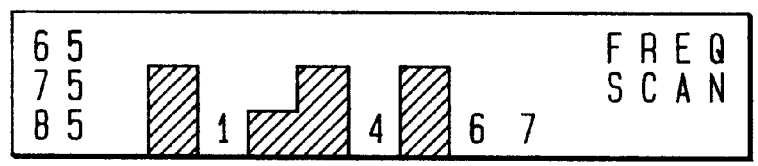
FIG. 6 depicts an illustrative screen showing the signal strength of frequency-disparate signals in a TDM system.

FIG. 6 depicts the display of FIG. 5 when wireless receiver 311 detects 4 signals in the 8 frequency bands (one signal with signal strength 75 dBm in frequency band 0, one signal with signal strength 65 dBm in frequency band 2, one signal with signal strength 75 dBm in frequency band 3, one signal with signal strength 75 dBm in frequency band 5).

Figure 7:
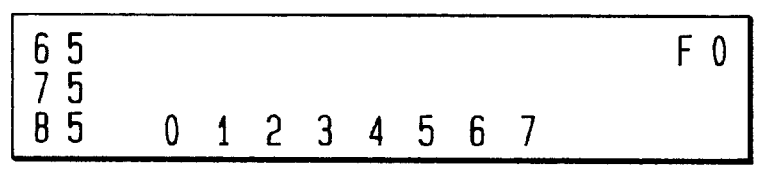
FIG. 7 depicts an illustrative screen showing the signal strength of temporally-disparate signals in a TDMA system.

FIG. 7 depicts display 205 as a bar graph of the signal strength of 8 temporally-disparate channels (labeled 0–7) in frequency band 0 of a TDMA system. According to the bar graph in FIG. 7, no signals have been found in any of the 8 time slots of frequency band 0 that have a signal strength above 85 dBm.

Figure 8:
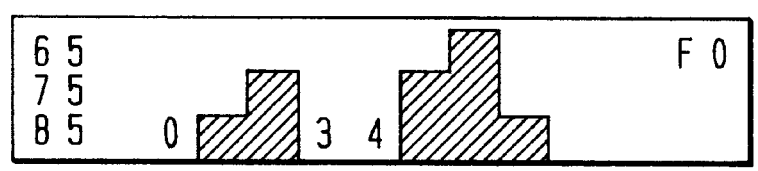
FIG. 8 depicts an illustrative screen showing the signal strength of temporally-disparate signals in a TDMA system.

FIG. 8 depicts the display of FIG. 7 when wireless receiver 311 detects 5 signals in the 8 time slots of frequency band 0 (one signal with signal strength 85 dBm in time slot 1, one signal with signal strength 75 dBm in time slot 2, one signal with signal strength 75 dBm in time slot 5, one signal with signal strength 65 dBm in time slot 6, one signal with signal strength 85 dBm in time slot 7).

Figure 9:
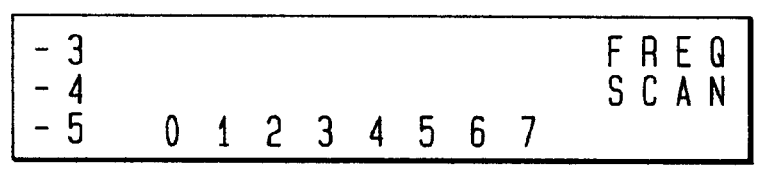
FIG. 9 depicts an illustrative screen showing the bit error rate of frequency-disparate signals in a TDM system.

FIG. 9 depicts display 205 as a bar graph of the bit error rate of 8 frequency-disparate channels (labeled 0–7) in a TDM configuration. The numbers "–3", "–4" and "–5" label the Y-axis as exponents of the bit error rate as measured by one bit error per $10^{-x}$ bits. According to the bar graph in FIG. 9, no signal has been found in any of the 8 frequency bands with a bit error rate of at least $10^{-5}$.

Figure 10:
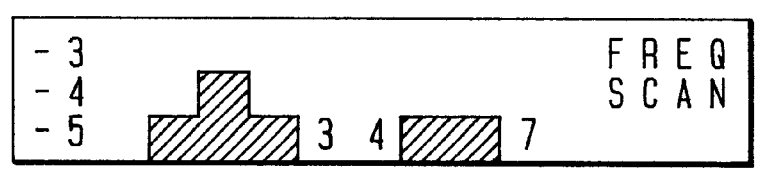
FIG. 10 depicts an illustrative screen showing the bit error rate of frequency-disparate signals in a TDM system.

FIG. 10 depicts the display of FIG. 9 when wireless receiver 311 detects 5 signals in the 8 frequency bands with error rates of at least $10^{-5}$ (one signal in frequency band 0 with a bit error rate of $10^{-5}$, one signal in frequency band 1 with a bit error rate of $10^{-4}$, one signal in frequency band 2 with a bit error rate of $10^{-5}$, one signal in frequency band 5 with a bit error rate of $10^{-5}$, one signal in frequency band 6 with a bit error rate of $10^{-5}$).

FIG. 11 depicts display 205 as a bar graph of the bit error rate of 8 temporally-disparate channels (labeled 0–7) in frequency band 2 in a TDMA configuration. According to the bar graph in FIG. 11, no signal has been found in any of the 8 time slots with a bit error rate of at least $10^{-5}$.

FIG. 12 depicts the display of FIG. 11 when wireless receiver 311 detects 2 signals in the 8 time slots with a bit error rate of at least $10^{-5}$ (one signal in time slot 0 with a bit error rate of $10^{-5}$, one signal in time slot 4 with a bit error rate of $10^{-5}$).

FIG. 13 depicts display 205 as it outputs an indicium of the source of each of the signals shown in FIG. 6 (the signal in frequency band 0 is transmitted by base station radio "135", the signal in frequency band 2 is transmitted by base station radio "029", the signal in frequency band 3 is transmitted by base station radio "007", the signal in frequency band 5 is transmitted by base station radio "092").

FIG. 14 depicts display 205 as it outputs an indicium of the source of each of the signals shown in FIG. 8 (the signal in time slot 1 is transmitted by a wireless terminal with the ID "121", the signal in time slot 2 is transmitted by a wireless terminal with the ID "829", the signal in time slot 4 is transmitted by a wireless terminal with the ID "119", the signal in time slot 5 is transmitted by a wireless terminal with the ID "892", the signal in time slot 6 is transmitted by a wireless terminal with the ID "036").

Returning to FIG. 4, at step 406 terminal processor 305 advantageously displays an indication which channels are occupied (as shown in FIGS. 5–14). At step 407, terminal processor 305 advantageously simultaneously displays an indicium of the source of a plurality of the incoming signals. At step 408, terminal processor 305 can, if the user desires, transmit some or all of the information relating to: (1) which scanned channels are occupied by signals, (2) the signal strength of each acquired signal, (3) the bit error rate of each acquired signal, and (4) the source of each acquired signal, back to a base station for storage or detailed analysis or both. From step 408, control passes back to step 401.

When wireless terminal 200 is not in test mode, meaning that it is in telecommunications mode, it functions as a conventional wireless terminal. At step 409, acoustic signals are converted by microphone 207 into outgoing signals that are transmitted to a base station (step 410), and at step 411 incoming signals are received and converted into acoustic signals through speaker 209.

What is claimed is:

1. A wireless terminal comprising:
   a first electro-acoustic transducer for converting a first acoustic signal into an outgoing signal;
   a wireless transmitter capable of transmitting said outgoing signal to a remote base station;
   a wireless receiver for receiving a plurality of incoming signals from said base station;
   a second electro-acoustic transducer for converting one of said plurality of incoming signals into a second acoustic signal;
   a visual display; and
   a terminal processor for determining a measure of signal strength for each of said plurality of incoming signals and for contemporaneously displaying an indicium of said measure of signal strength for each of said plurality of incoming signals onto said visual display.

2. The wireless terminal of claim 1 wherein each of said plurality of incoming signals occupies one of a plurality of frequency-disparate communications channels.

3. The wireless terminal of claim 2 wherein said terminal processor contemporaneously displays on said display an indicium of which of said plurality of frequency-disparate communications channels is occupied by one of said plurality of incoming signals.

4. The wireless terminal of claim 1 wherein each of said plurality of incoming signals occupies one of a plurality of temporally-disparate communications channels.

5. The wireless terminal of claim 4 wherein said terminal processor contemporaneously displays on said display an indicium of which of said plurality of temporally-disparate communications channels is occupied by one of said plurality of incoming signals.

6. A wireless terminal comprising:
   a first electro-acoustic transducer for converting a first acoustic signal into an outgoing signal;
   a wireless transmitter for transmitting said outgoing signal to a remote base station;
   a wireless receiver for receiving a plurality of incoming signals from said base station;
   a second electro-acoustic transducer for converting one of said plurality of incoming signals into a second acoustic signal;
   a visual display; and
   a terminal processor for determining a bit error rate for each of said plurality of incoming signals and for contemporaneously displaying an indicium of said bit error rate for each of said plurality of incoming signals onto said visual display.

7. The wireless terminal of claim 6 wherein each of said plurality of incoming signals occupies one of a plurality of frequency-disparate communications channels.

8. The wireless terminal of claim 7 wherein said terminal processor contemporaneously displays on said display an indicium of which of said plurality of frequency-disparate communications channels is occupied by one of said plurality of incoming signals.

9. The wireless terminal of claim 6 wherein each of said plurality of incoming signals occupies one of a plurality of temporally-disparate communications channels.

10. The wireless terminal of claim 9 wherein said terminal processor contemporaneously displays on said display an indicium of which of said plurality of temporally-disparate communications channels is occupied by one of said plurality of incoming signals.

11. A method of operating a wireless terminal comprising:
converting a first acoustic signal into an outgoing signal with a first electro-acoustic transducer;
transmitting said outgoing signal to a remote base station with a wireless transmitter;
receiving a plurality of incoming signals with a wireless receiver;
converting one of said plurality of incoming signals into a second acoustic signal with a second electro-acoustic transducer;
determining a measure of signal strength for each of said plurality of incoming signals with a terminal processor; and
contemporaneously displaying on a visual display an indicium of said measure of signal strength for each of said plurality of incoming signals.

12. The method of claim 11 wherein each of said plurality of incoming signals occupies one of a plurality of frequency-disparate communications channels.

13. The method of claim 12 further comprising contemporaneously displaying on said display an indicium of which of said plurality of frequency-disparate communications channels is occupied by one of said plurality of incoming signals.

14. The method of claim 11 wherein each of said plurality of incoming signals occupies one of a plurality of temporally-disparate communications channels.

15. The method of claim 14 further comprising contemporaneously displaying on said display an indicium of which of said plurality of temporally-disparate communications channels is occupied by one of said plurality of incoming signals.

16. A method of operating a wireless terminal comprising:
converting a first acoustic signal into an outgoing signal with a first electro-acoustic transducer;
transmitting said outgoing signal to a remote base station with a wireless transmitter;
receiving a plurality of incoming signals with a wireless receiver;
converting one of said plurality of incoming signals into a second acoustic signal with a second electro-acoustic transducer;
determining a bit error rate for each of said plurality of incoming signals with a terminal processor; and
contemporaneously displaying on a visual display an indicium of said bit error rate for each of said plurality of incoming signals.

17. The method of claim 16 wherein each of said plurality of incoming signals occupies one of a plurality of frequency-disparate communications channels.

18. The method of claim 17 further comprising contemporaneously displaying on said display an indicium of which of said plurality of frequency-disparate communications channels is occupied by one of said plurality of incoming signals.

19. The method of claim 16 wherein each of said plurality of incoming signals occupies one of a plurality of temporally-disparate communications channels.

20. The method of claim 19 further comprising contemporaneously displaying on said display an indicium of which of said plurality of temporally-disparate communications channels is occupied by one of said plurality of incoming signals.

* * * * *